Patented Feb. 10, 1925.

1,526,299

UNITED STATES PATENT OFFICE.

WILLIAM G. O'BRIEN, OF AKRON, OHIO, ASSIGNOR TO THE GOODYEAR TIRE & RUBBER COMPANY, OF AKRON, OHIO, A CORPORATION OF OHIO.

METHOD OF MANUFACTURING RUBBERIZED FIBER COMPOSITION.

No Drawing.   Application filed October 20, 1922.   Serial No. 595,871.

*To all whom it may concern:*

Be it known that I, WILLIAM G. O'BRIEN, a citizen of the United States, and resident of Akron, Ohio, have invented new and useful Improvements in Methods of Manufacturing Rubberized Fiber Composition, of which the following is a specification.

My invention relates to a process for the manufacture of a rubberized fibrous material capable of many useful applications, such as for floor or wall coverings, as a substitute for leather, or for any other purpose to which a tough flexible porous water resistant body may be adapted.

One of the objects of my invention consists in establishing an extremely intimate contact between the fibers and the rubber.

Another object of my invention consists in providing a novel method of manufacturing the composition, which obviates the possibility of shrinkage of the rubber away from the fiber during the course of its manufacture.

A further object of my invention consists in providing a method whereby the quantity of rubber which is precipitated free during the course of manufacture and which must be salvaged from the precipitant which is drained from the fibers is materially reduced.

In practicing my invention I add the fibers in a partially beaten separated state to the rubber mix either before the milling process or during the milling process while the rubber is in the form of dough. After thoroughly intermixing the fibers and the milled rubber, the mass is thinned to a cement by the addition of a rubber solvent. The rubber is then precipitated upon the fibers by any of a number of suitable processes. An additional quantity of beaten and separated fibers may be added to the mixture prior to the precipitation of the rubber, or, it may be added subsequently to the precipitation of the rubber if desired. The combined mixing and milling operation whereby the fibers and the rubber are thoroughly intermixed serves to reduce and separate the individual fibers, thus permitting of the addition of fibers which are less thoroughly beaten than those usually admitted to the rubber mix.

On account of the intimate association between the fibres and the rubber prior to the solution of the rubber and during the period in which it is in solution, the rubber tends to shrink into and around the fibers upon precipitation rather than away from the fibers into separate and independent particles. This permits of the use of more highly polymerized rubber and this in turn, results in a very tough and sturdy product. Also, on account of the tendency of the rubber to cling to the fibers upon precipitation, the quantity of rubber that is precipitated free, and is strained from the fibers with the liquid mixture, is reduced to a minimum. The more intimate contact of the rubber in and around the fibers serves to produce a very homogeneous and flexible product.

While I have described in detail but a single form which my invention may assume, it will be obvious to those skilled in the art that it is not so limited but that various minor changes and modifications may be made therein without departing from the spirit of my invention or from the scope of the appended claims.

What I claim is:

1. The method of making a rubberized fiber composition which comprises milling together a quantity of fibers and rubber, dissolving the rubber and precipitating it upon the fibers.

2. The method of making a rubberized fiber composition which comprises milling together a quantity of fibers and rubber and subsequently causing the rubber to pass into solution, and precipitating the rubber upon the fibers.

3. The method of making a rubberized fiber composition which comprises mixing together a quantity of separated fibers and a quantity of finely divided particles of rubber, dissolving the rubber and precipitating it upon the fibers.

In witness whereof, I have hereunto signed my name in the presence of two subscribing witnesses.

WILLIAM G. O'BRIEN.

Witnesses:
F. A. LIND,
O. E. BEE.